July 27, 1937.  G. WUESTEFELDT  2,088,357

PISTON SEAL

Filed Nov. 19, 1934

INVENTOR
GEORGE WUESTEFELDT
BY Whittemore Hulbert
Whittemore & Belknap
ATTORNEYS Patented July 27, 1937

2,088,357

UNITED STATES PATENT OFFICE 2,088,357

PISTON SEAL

George Wuestefeldt, Lochmoor Village, Mich.

Application November 19, 1934, Serial No. 753,706

1 Claim. (Cl. 309—33)

The invention relates to sealing means for use on relatively movable members, being more particularly designed for application to pistons. It is the object of the invention to obtain a construction which forms an effective seal and which will adapt itself to all irregularities in the cylinder wall during movement of the piston. It is a further object to obtain a construction adapted for installation in the piston as manufactured and which will have an equal length of life, rendering replacement unnecessary. With these objects in view the invention consists in the construction as hereinafter set forth.

Broadly described, my improved sealing means comprises two oppositely facing series of nested cups which surround and are anchored in the piston with their peripheral edges in contact with the cylinder wall. Each of the cups is slitted to divide the same into a large number of independently movable peripheral segments, the slots of adjacent cups being staggered so as to be out of registration and therefore forming a seal. The cups are held in contact with the cylinder wall by their own resiliency in conjunction with fluid pressure exerted directly against the outermost member of each series, and through such member communicated to the other members. This insures sealing contact at all points while the pressure against the cylinder wall will be proportional to the pressure of the fluid which is retained by the seal.

Figure 1:
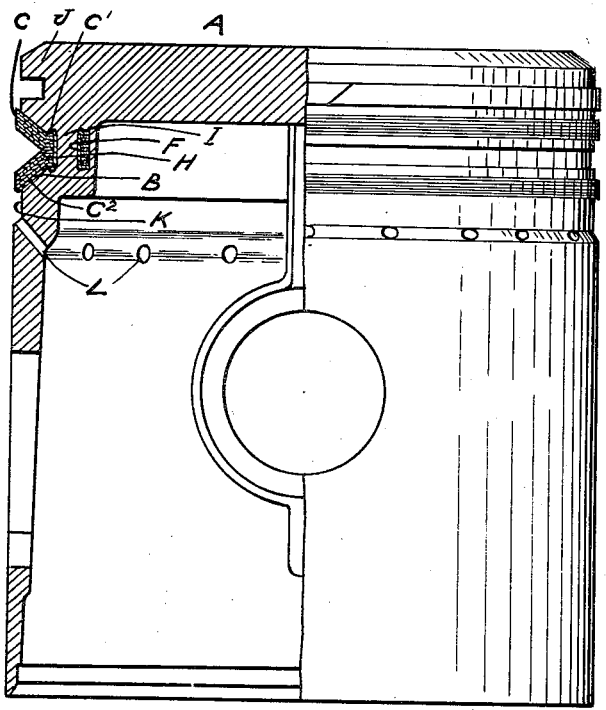
Fig. 1 is a vertical central sectional view partly in elevation of a piston provided with my improved sealing means.

As shown in Fig. 1, A is a piston of any suitable construction, provided with an annular groove B of V-shaped cross section. In this groove are located the two series of nested cups, being formed of individual cup members C having bottom portions C' and conical flange portions $C^2$. The flanges $C^2$ are radially slotted at D to divide the peripheral portion of each flange into a series of short segments E forming in effect flexible tongues. The cups are secured to each other with the slots D of adjacent cups out of registration, preferably by hollow rivets F which pass through aligned apertures in the bottom portion C', being located at a suitable number of points around the inner circumference. Where the cups C are all alike, the nesting of the flanges $C^2$ in contact with each other will leave spaces between the bottom portions C' which are filled by spacer members G. Thus all of the cups of both series will be clamped as a unit.

Inasmuch as each of the cups C forms a complete annulus, it is obvious that they can not be assembled in the groove B after formation of the same in an integral piston. Thus it is necessary either to form the piston of detachable members arranged upon opposite sides of the groove, or preferably to cast the piston around the seal. This latter construction is illustrated in Fig. 1 and it will be noted that the metal of the piston surrounds the inner periphery of the portions C' of the cups as indicated at H, and also passes through the hollow rivets F to form connecting struts I. The outer end members of each series will thus define the walls of the groove. The piston is preferably formed by die casting, the sealing member being incorporated in the die during the casting operation. The flanges $C^2$ of the cups project slightly beyond the peripheral wall J of the piston head to make contact with the cylinder wall and with the necessary clearance for the piston. The piston is also preferably provided with an annular recess K below the lower series which forms an oil groove communicating with drain ports L extending through the piston skirt.

The cups may be formed of sheet metal stampings which for pistons not over five inches in diameter may be formed of metal of a thickness varying from .002 to .012 of an inch and the width of the tongues E between the slots D may vary from one-eighth to three-eighths. The angle of the conical flange with respect to the axis of the cups may be varied within maximum and minimum limits of 45° and 10°, but preferably not over 25°, which is suitable for average conditions. The peripheral edges of the cups are machined or ground to the cylinder walls.

With the construction as described, in operation the gaseous pressure in the chamber above the piston will be communicated through the clearance between piston and cylinder, to the exposed area of the uppermost member of the cups. This will tend to bend the tongues E downward, thereby forcing their peripheral edges into firm sealing contact with the cylinder wall and communicating like pressure to the tongues of the other cups in series. Where the pressure is high, as peak explosion pressure, the peripheral pressure against the cylinder wall will be greatest, but as the gas pressure drops during the working stroke, the pressure of the cups against the cylinder wall will be corespondingly diminished. In the same manner, the pressure of lubricant against the lowermost cup of the lower series will tend to force the peripheral edges into firm contact with the cylinder wall, thereby diminishing the thickness of the oil film. If there are irregularities in the cylinder wall, such as being out of round, or of greater diameter in one point of the stroke than another, these will be compensated for by the individual flexing of the tongues E under pressure of the fluid bearing thereagainst, so that at all times the seal will be effected both against gas leak and oil pumping. As the peripheral edges of the cups wear, they will still be maintained in sealing contact with the cylinder wall, but further flexing of the tongues and the amount of adjustment thus permitted will compensate for all wear that will take place in the average life of a piston. Thus it will be unnecessary to change the sealing means after it is once installed.

Figure 4:
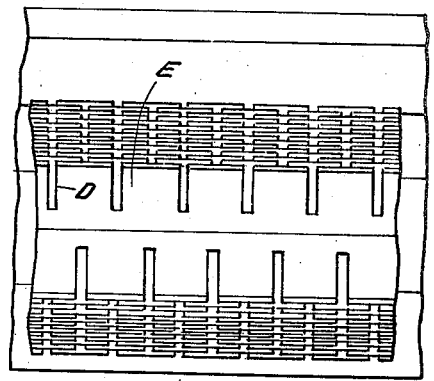
Fig. 4 is an enlarged elevation of a portion of the sealing means as exposed on the periphery of the piston.
Figure 3:
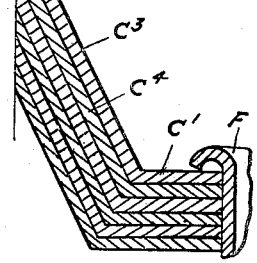
Fig. 3 is a similar view of a modified construction.
Figure 2:
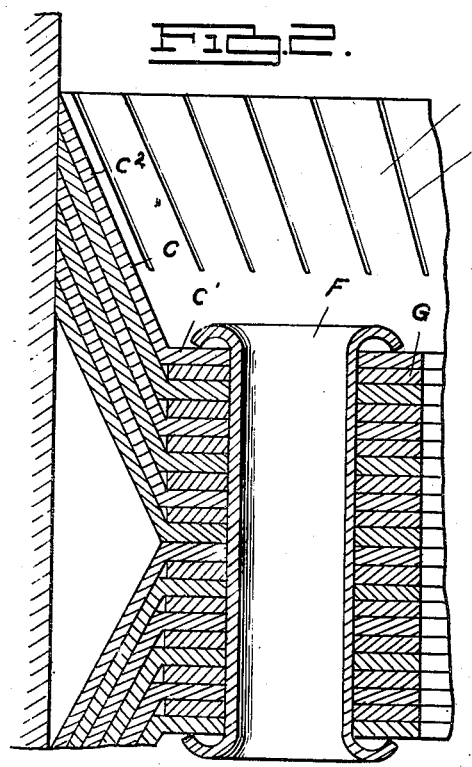
Fig. 2 is an enlarged sectional view showing the manner of assembly and the cups of the sealing means.

In the modification as shown in Fig. 4, instead of nesting cups which are all precisely the same, successive cups of the series $C^3$, $C^4$, etc. may be varied so as to nest within each other and to dispense with the necessity of any spacers such as G between the bottom portions C'.

Figure 5:
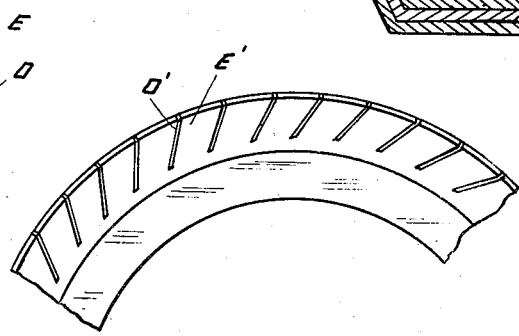
Fig. 5 is a plan view of a portion of one of the cups showing a modified construction.

In slotting the cups to form the resilient flexible tongues E' it may be preferable to incline the slots D' with respect to the axial plane, this being illustrated in Fig. 5. This will increase the length and reduce the width of the tongue, which will impart a greater flexibility thereto.

What I claim as my invention is:

The combination with a piston, of sealing means therefor comprising two oppositely facing series of nested cups having parallel bottom portions and conical outwardly extending flange portions at an angle of less than 45° and more than 10° to the axis of the cups, the conical flanges of the cups being slotted from the periphery inward to form a series of flexible tongues and the slots in the flanges of adjacent cups being staggered, hollow rivets clamping the parallel portions of said cups to each other and said piston being cast about said sealing means to imbed the same, having strut portions passing through said hollow rivets.

GEORGE WUESTEFELDT.